United States Patent [19]

Willmouth

[11] Patent Number: 4,508,972
[45] Date of Patent: Apr. 2, 1985

[54] ARMATURE LIFT WINDMILL

[76] Inventor: Robert W. Willmouth, 1011 Frederick St. South, Arlington, Va. 22202

[21] Appl. No.: 572,285

[22] Filed: Jan. 20, 1984

[51] Int. Cl.³ ............................................. F03D 9/00
[52] U.S. Cl. ...................................... 290/55; 290/44; 290/42; 290/54; 416/132 B
[58] Field of Search ..................... 290/42, 43, 44, 53, 290/54, 55; 417/334; 416/5-17, 23, 41 R, 41 A, 44 A, 50 A, 121 A, 132 B, 132 A, 169 B, 197 A

[56] References Cited

U.S. PATENT DOCUMENTS

| 692,714 | 2/1902 | Sala et al. | 416/197 |
|---|---|---|---|
| 1,560,535 | 11/1925 | Burton | 340/601 |
| 2,612,043 | 9/1952 | Chisholm et al. | 340/601 |
| 2,619,527 | 11/1952 | Gray | 340/601 |
| 3,162,847 | 12/1964 | Hoffman | 340/241 |
| 3,534,191 | 10/1970 | Siakel | 200/81.9 |
| 3,537,008 | 10/1970 | Wells | 340/241 |
| 3,898,471 | 8/1975 | Schera | 290/42 |
| 3,944,839 | 3/1976 | Carter | 290/55 |
| 4,203,707 | 5/1980 | Stepp | 416/119 |
| 4,247,253 | 1/1981 | Seki et al. | 416/44 |
| 4,255,085 | 3/1981 | Evans | 416/197 A |
| 4,329,593 | 5/1982 | Willmouth | 290/55 X |
| 4,342,539 | 8/1982 | Potter | 416/9 |
| 4,364,709 | 12/1982 | Tornquist | 416/197 A X |
| 4,406,584 | 9/1983 | Stepp | 416/41 |
| 4,419,587 | 12/1983 | Benton | 416/197 A X |

Primary Examiner—J. V. Truhe
Assistant Examiner—Paul Shik Luen Ip
Attorney, Agent, or Firm—Griffin, Branigan & Butler

[57] ABSTRACT

Airfoils (32) are secured to the frame (26) of a vertical axis windmill (20) to provide vertical lift to a rotatable vertical shaft (22) and to armatures (54) of electrical generators (50), thereby eliminating friction between each armature (54) and its end bearing (58) as well as between the vertical shaft (22) and its end bearing (68). An indicator (180) provides an indication that the generators (50) of the windmill (20) are generating an alternating electrical current having at least a predetermined voltage magnitude.

28 Claims, 13 Drawing Figures

ARMATURE LIFT WINDMILL

BACKGROUND OF THE INVENTION

1. Field of the Invention

This invention relates to wind-powered machines, and particularly to methods and apparatus for reducing the friction forces involved in the operation of such machines.

2. Prior Art and other Considerations

U.S. Pat. No. 4,329,593 to Willmouth shows an embodiment of a wind-powered machine comprising a drive shaft which rotates about a vertical axis under the influence of wind impinging on cup impellers connected to the drive shaft by a frame. An armature or rotor of a generator has a gear keyed thereto to mesh with a gear keyed to the drive shaft. The rotor is supported radially by ball bearings and vertically by an end bearing. The end bearing comprises a hardened tungsten steel point which may be rounded slightly and a hardened tungsten steel block upon which the point rests. Alternate embodiments of the end bearing are also provided. While the structures of U.S. Pat. No. 4,329,593 significantly decrease the friction and resistance between the armature rotor and the mainbearings which support the rotor, the advantages of the present invention have not heretofore been realized.

SUMMARY

A vertical axis windmill comprises a vertically slidable, rotatable vertical shaft which is connected by a horizontally extending frame to a plurality of wind-driven elements on the frame periphery. The frame includes a plurality of radial members having the shape of an inverted right triangle in cross-section. Planar airfoils are secured to the hypotenuse surface of the frame radial members so that a vertical lift is created when the wind velocity is of a sufficient magnitude. The vertical lift causes the rotatable vertical shaft to rise out of contact with an end bearing upon which it would otherwise be supported. The rotatable vertical shaft has a collar secured thereto which, when the shaft rises, contacts and elevates a horizontally extending lift bar. As the lift bar is elevated. The lift bar, in turn, contacts a collar on an armature or rotor of an electrical generator, causing the armature to rise as well. The armature, which slidably extends through its associated coil, rises out of contact with its end bearing upon which it would otherwise be supported.

In one embodiment, a windmill is used to supply supplemental alternating electrical current to a primary source. An indicator is connectable intermediate the generating means of the windmill and the primary source to indicate when the alternating electrical current supplied by the windmill generator is above a predetermined voltage level.

In another embodiment, an indicator is associated with a modular unit which plugs into a conventional wall socket to connect to the primary source, and which in turn functions as a socket to receive electric conductors from the windmill generator. Chargable DC batteries are also connectable intermediate the generating means of the windmill and the primary electrical source. In yet another embodiment, the indicator is associated with a modular unit having two sets of prongs for selective insertion into a special wall socket. The special wall socket allows one set of the modular prongs to connect to the primary source and the other set of modular prongs to communicate with electrical conductors from the windmill generator.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
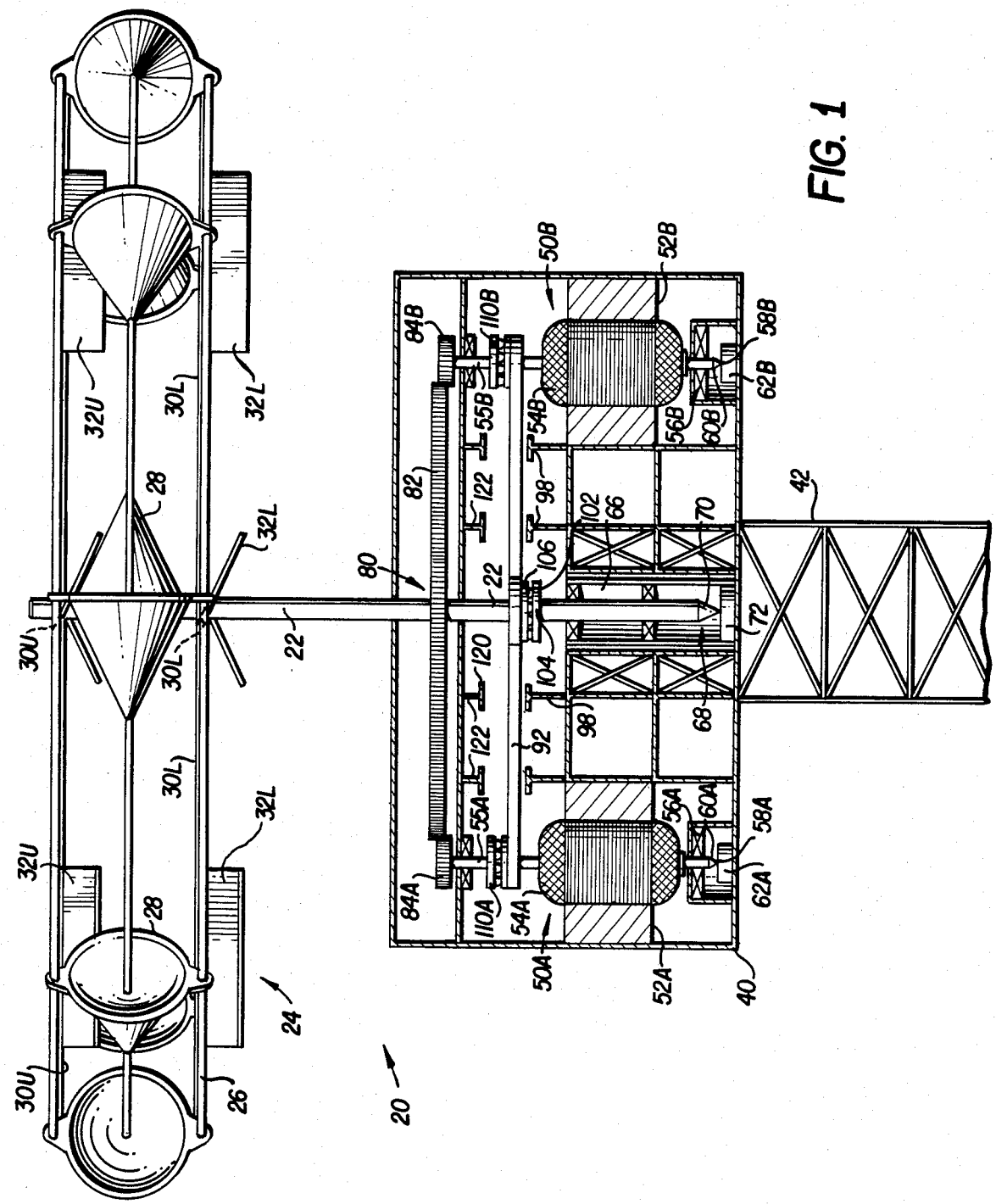
FIG. 1 is a schematic view of a vertical axis windmill according to an embodiment of the invention.

FIG. 1 shows a vertical axis windmill 20 including a rotatable vertical shaft 22 which supports an impeller means 24. The impeller means 24 includes an essentially horizontally-extending frame 26 and a plurality of wind-driven elements, such as cups 28. The construction of the cups 28 and the manner of their attachment to the frame 26 of the windmill 20 of the embodiment of FIG. 1 is shown in U.S. Pat. No. 4,329,593 to Willmouth which is incorporated herein by reference. However, unlike the frame illustrated in the referenced patent and as further described hereinafter, the frame 26 of the present invention comprises radial members or radial struts 30 each of which have an airfoil 32 secured thereto. A set of four upper struts 30U lie in an essentially horizontal plane comprising the top of the frame 26 while a set of four lower struts 30L lie in a lower essentially horizontal plane comprising the bottom of the frame 26. The upper struts 30U have airfoils 32U secured thereto, while the lower struts 30L have airfoils 32L secured thereto.

The lower end of the vertical shaft 22 is rotatably received in a housing 40 which is mounted on a support or tower 42. Located within the housing 40 is electrical generator means 50 which, in the embodiment of FIG. 1, includes a first electrical generator 50A and a second electrical generator 50B. Each generator 50 includes a coil winding 52 and an armature or rotor 54 which rotates about a vertical axis. The rotor 54 of each generator is vertically slidable within its surrounding coil 52. Each rotor 54 has a vertically extending rotor shaft 55. At its lower end the rotor shaft 55 of each rotor 54 is supported radially by ball bearings 56 and vertically by an end bearing 58. In the embodiment of FIG. 1, the bearing 58 comprises a hardened tungsten steel point 60 which may be rounded slightly and a hardened tungsten steel block 62 upon which the point rests. It should be understood, however, that other types of end bearings such as those depicted in U.S. Pat. No. 4,329,593 are utilized in alternative embodiments.

The rotatable vertical shaft 22 has its lower end supported radially by ball bearings 66 and vertically by an end bearing 68. In the embodiment of FIG. 1, the end bearing 68 comprises a hardened tungsten steel point 70 which may be rounded slightly and a hardened tungsten steel block 72 upon which the point rests.

Also included in the housing 40 of the windmill 20 is rotational transmission means 80 whereby the rotational motion of the rotable vertical shaft 22 is transmitted to the armatures 54 of the respective electrical generators 50. The transmission means 80 includes a large circular gear 82 keyed to the shaft 22 and adapted to mesh with gears 84A and 84B keyed to the respective armature shafts 55A and 55B.

Lift transmission means 90 is also provided to transmit vertical lift created by the airfoils 32 to the rotors 54 to enable the rotors 54 to be vertically lifted above their end bearings 58 upon which the lower end of the armature shafts 55 would otherwise be in contact. Transmission means 90 includes an essentially horizontal lift bar 92. Lift bar 92 has a central aperture 94 therein through which the shaft 22 can vertically slide without contact with bar 92. At each of its ends the lift bar 92 has comparable apertures 96 which permit the armature shafts 55 to travel vertically therethrough. When the windmill 20 is not in operation, or when the velocity of the wind is less than 10 mph, the lift bar 92 rests on the upper surfaces of two lower stop members 98. Lower stop members 98 are connected by rigid supports 100 to the housing 40.

The lift transmission means 90 also includes an essentially annular collar 102 secured to the rotable vertical shaft 22 by one or more set screws 104. Collar 102 has an outer diameter greater than that of the shaft 22. The upper surface of collar 102 is provided with a plurality of circularly arranged captured ball bearings 106. Ball bearings 106 are arranged in a circle having its center at the axis of shaft 22. The circle of bearings 106 has a radius greater than the radius of the aperture 94 in the lift bar 92. A horizontal plane tangent to the tops of the ball bearings 106 lies slightly below (about 1/16 inch) a horizontal plane defined by the upper surfaces of the lower stop members 98 when the lower end of the shaft 22 has its point 70 in contact with block 72 comprising the end bearing 68.

Figure 5:
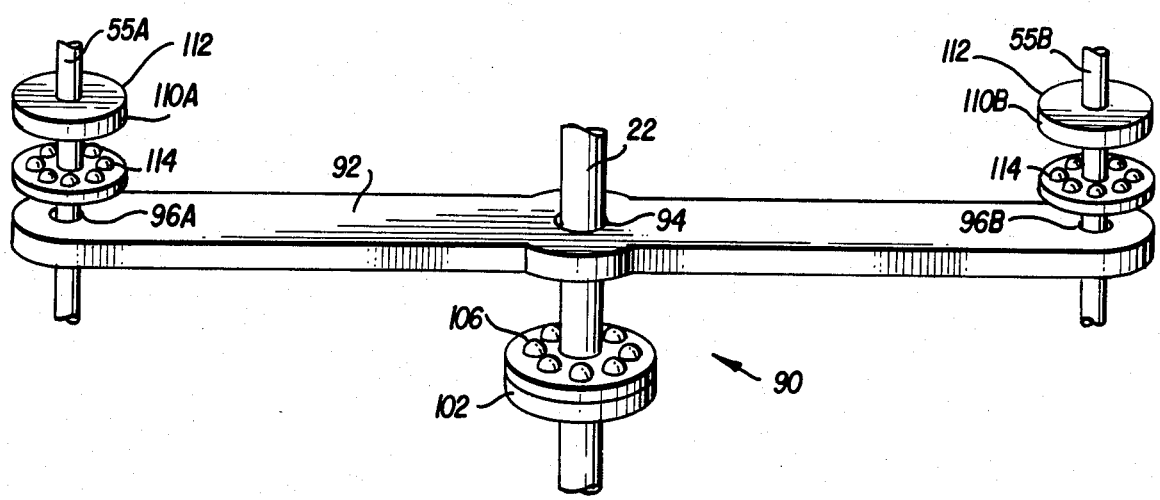
FIG. 5 is a perspective view of the lift transmission means of FIG. 4.

The lift transmission means 90 further includes a collar 110 secured to the upper end of each of the armature shafts 55. The collars 110 are each of a greater outer diameter than the respective shafts 55 through which they are secured by set screws 112. In the embodiment of FIG. 5 a plurality of circularly arranged captured ball bearings 115 are provided on the upperside of lift bar 92. The circle in which the ball bearings 115 are arranged has its center at the center of aperture 96 and has a radius greater than the radius of the aperture 96 but less than the radius of the collar 110.

The lift transmission means also includes upper stop members 120 which are suspended by rigid members 122 from the top of the housing 40. A plane defined by the bottom surfaces of the stop members 120 lies approximately ¼ inch in a vertical sense above the horizontal plane defining the top surfaces of the lower stop members 98.

Figure 2:
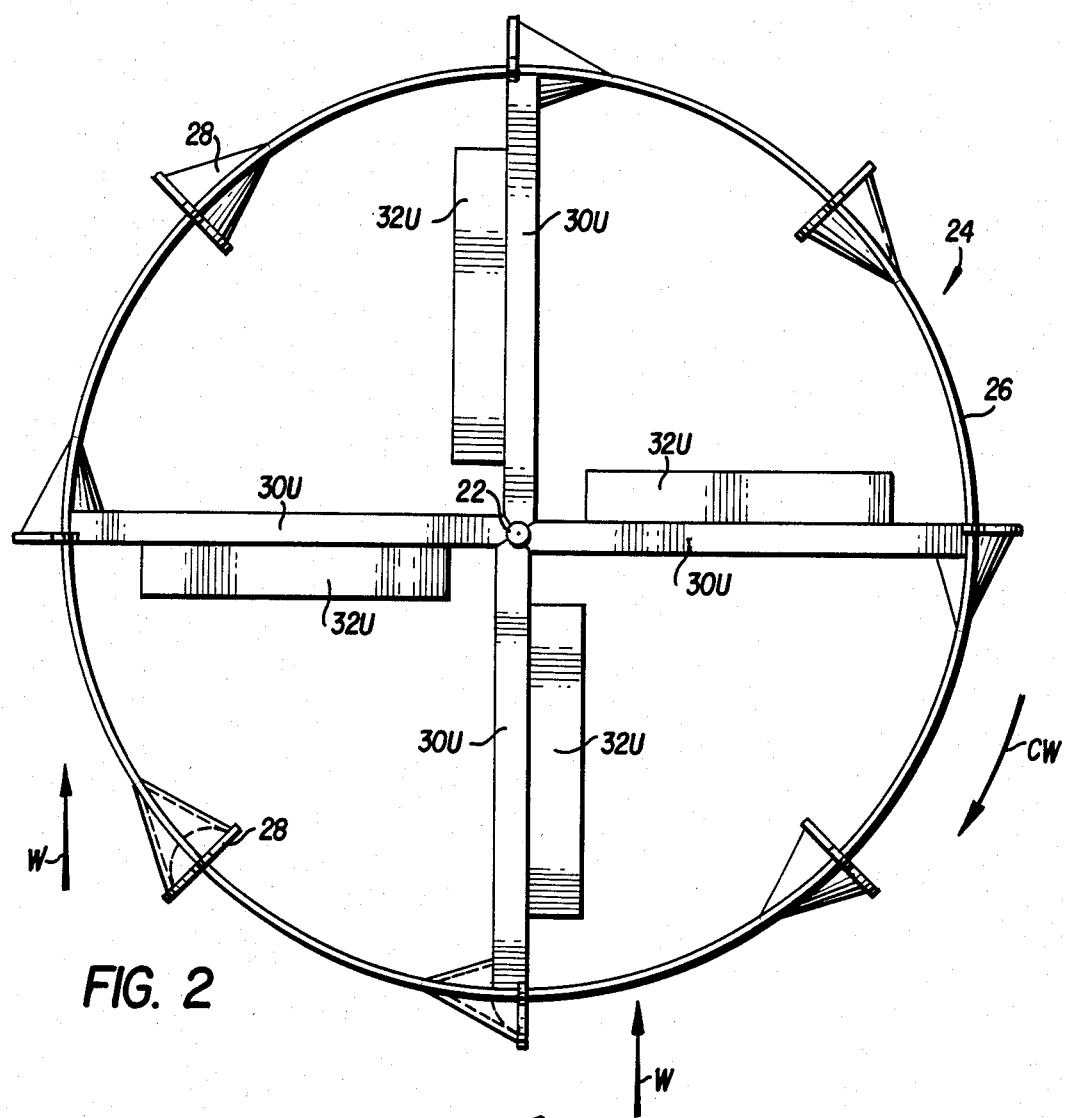
FIG. 2 is a top view of an impeller means of the windmill of the embodiment of FIG. 1.

Turning now to further discuss the frame 26, it has been mentioned that frame 26 includes a set of four upper radial struts 30U and a set of four lower radial struts 30L. As seen in FIG. 2, the struts 30 in each set extend radially from the shaft 22 to which they are keyed to the periphery of the frame 26. The struts 30 are orthogonally arranged with respect to neighboring struts.

Figure 3:
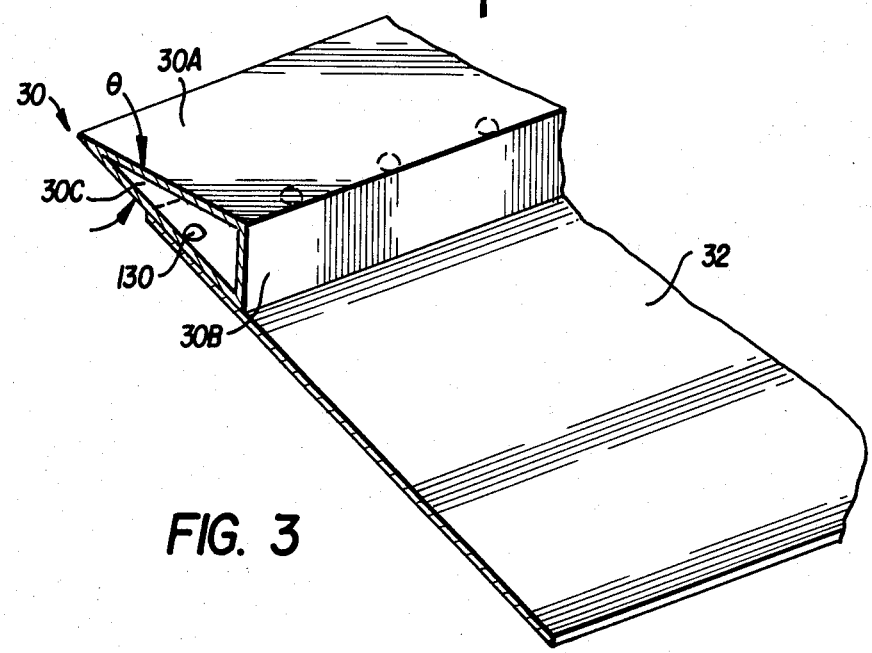
FIG. 3 is a cross-sectional perspective view of airfoil means and frame means of the impeller means of FIG. 2.
Figure 4:
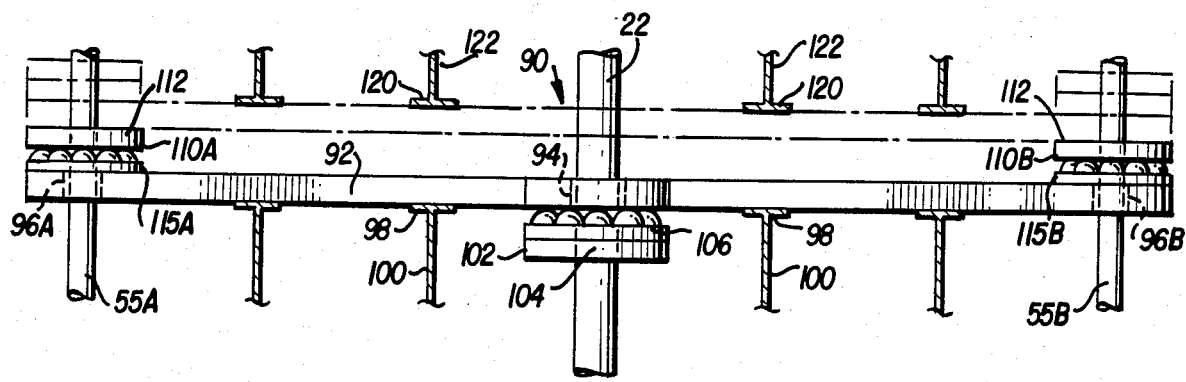
FIG. 4 is a partial front view of lift transmission means of the windmill of the embodiment of FIG. 1.

As seen in FIG. 3, each strut 30 is essentially triangular and hollow in cross-section. In particular, each strut 30 has an inverted base 30A which lies essentially in a horizontal plane; a vertical leg 30B perpendicular to and depending from the base 30A; and, an inclined hypotenuse 30C. In a preferred embodiment, the angle Theta is on the order of about 10°. An intermediate section of each strut 30 has the airfoil 32 secured underneath to its hypotenuse surface 30C. A portion of the upper surface of airfoil 32 contacts the lower surface of the hypotenuse 30C and where the two surfaces overlap they are secured together by fasteners 130 or welded together. As seen in FIG. 2, it is understood that the leg 30B of each strut 30 has the same orientation as the top or open end of each wind-driven element 28. Conversely, the angle Theta of each strut 30 is similarly oriented to the conical end of a wind-driven member 28. In FIG. 2 the direction of the wind is shown by arrows labeled W; the direction of clockwise rotation of the frame 26 shown by the arrow labled "CW".

In one embodiment, each of the struts 30 extends eight feet from the vertical shaft 22 to the frame periphery 26. Each strut 30 measures three inches across its inverted base 30A and one inch along its vertical leg 30B. The airfoils 32 are each planar members measuring two feet long by eight inches wide, two inches of the width being in contact with the underneath hyponetuse surface 30C of the strut 30. The struts 30 are preferably comprised of steel while the airfoils 32 are preferably fabricated from aluminum.

It should be evident to those skilled in the art that the lifting force provided by the airfoils 32 can be increased or decreased by changing the dimensions of the airfoils 32 as well as their angular orientation. For example in another embodiment the angle Theta is on the order of about 20°. In any event, the amount of lift to be created by the airfoils 32 when the wind velocity is in access of 10 mph should be sufficient to lift the two armatures 54 as well as the frame 26 and shaft 22. In the presently described embodiment, a total effective wing span measuring 16 feet long by four feet wide is provided which, at a 20° angle as described hereinbefore, provides approximately 30 pounds of lift. The housing 40 of the currently described embodiment is 15 inches high, 30 inches wide, and 25 inches in depth. Gears 84 are approximately two inches in diameter while gear 82 is approximately 18 inches in diameter. Lift bar 92 is approximately 22 inches long; 1¼ inches wide; and, ⅜ inches thick. Lift bar 92 is preferably fabricated from steel.

Figure 6:
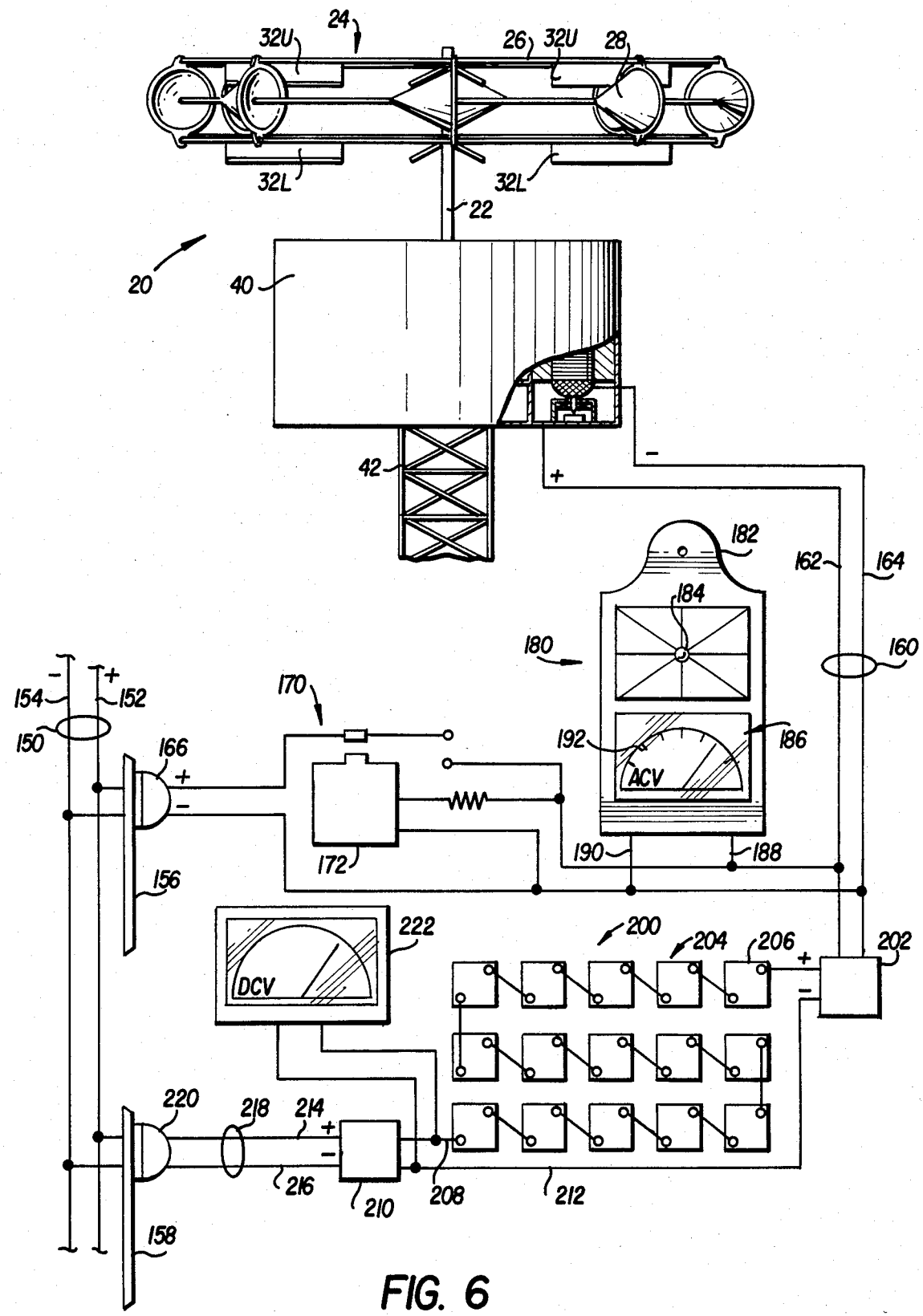
FIG. 6 is a schematic view of a vertical windmill and electrical connections to a primary source of alternating electrical current.

FIG. 6 illustrates a mode of using the windmill 20 and particularly the electrical generator means 50 thereof as a supplemental source of alternating electric current to a primary source of electrical current. The primary source of alternating electrical current is connected to an electrical utility line 150, such as a conventional utility line wired in a residence or the like. Utility line 150 includes both a positive lead 152 and a negative lead 154. Access to the utility line 150 is achieved through conventional wall sockets, such as wall sockets 156 and 158.

The electrical generator means 50 of windmill 20 is connected by electrical conductor 160 to the utility line 150. The electrical conductor 160 includes a positive line 162 and a negative line 164. Positive line 162 is connected to the positive terminals of both of the generators 50A and 50B included in the electrical generator means 50. Likewise, negative line 164 is connected to the negative terminals of both of the generators 50A and 50B. With the generators 50A and 50B so connected by conductor 160 to the utility line 150, the generator means 50 is capable of serving as a supplemental source of alternating electrical current to the electrical utility line 150. Electrical conductor 160 connects to the utility line 150 through a plug 166 which mates with the wall socket 156 as shown in FIG. 6.

In order to ensure that electrical current flows only in the direction from the generator means 50 to the utility line 150 rather than in the reverse direction, current rectifier means 170 is connected intermediate the generator means 50 and the utility line 150. In the embodiment illustrated in FIG. 6, the current rectifier means 170 includes a conventional 110 volt relay coil 172. In unillustrated embodiments the current rectifier means 170 comprises a conventional relay coil with a 12 volt resistor (which functions as a switch to turn the coil off when appropriate) or a conventional silicon rectifier. The current rectifier means precludes the current on the utility line 150 from backing up onto the conductor 160.

An indicator device 180 is connected to the electrical conductor 160 intermediate the generator means 50 and the current rectifier means 170. Indicator device 180 comprises a thin plaque 182 fabricated from plastic or the like and having an essentially flat rectangular surface thereon for the mounting of both indicator means 184 and information display means 186. The plaque 182 is, in one embodiment, adapted to be hung from a wall. In the embodiment shown, the indicator means 184 comprises a light bulb such as a conventional 7-watt light bulb received in an appropriate light bulb socket. A positive terminal of the light bulb socket for the indicator means 184 is connected through a positive lead 188 and a 100 volt resistor 189 thereon to the positive line 162 of the conductor 160. The negative terminal of the light bulb socket is connected by negative lead 190 to the negative line 164 of the conductor 160.

The informational display means 186 of the indicator 180 comprises an alternating current volt meter 192 having a graduated voltage scale visible on the front side of the plaque 182. On the rear side of the plaque a positive terminal of the volt meter 192 is connected to the lead 188; a negative terminal of the volt meter 192 is connected to the lead 190.

Figure 7A:
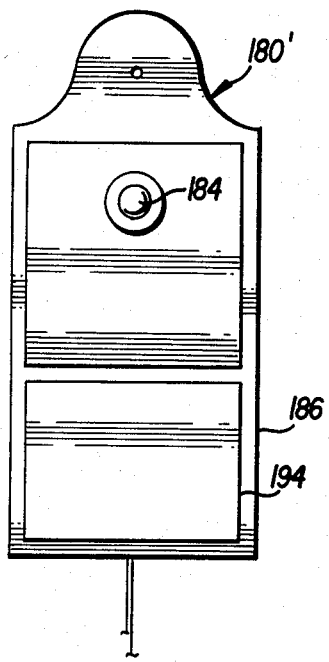
FIGS. 7A, 7B, and 7C are front, side, and back views, respectively, of an indicator device according to an embodiment of the invention.
Figure 7B:
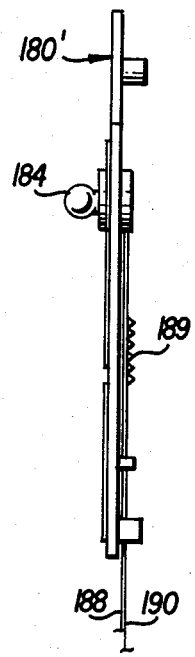
Figure 7C:
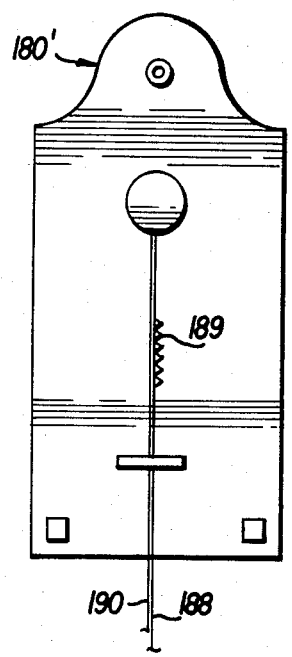

FIG. 7A, 7B, and 7C illustrate an alternate embodiment of the indicator means 180 wherein the informational display means 186 comprises a legible wind chill chart 194. It should be apparent to the man skilled in the art that numerous types of displays may be utilized as alternate embodiments of the informational display means 186, such as a barometer, a thermometer or the like.

FIG. 6 also illustrates a battery charging system 200 connected intermediate the generator means 50 of the windmill 20 and the utility line 150. The battery charging system includes a first inverter 202 having a positive input terminal connected to line 162 and a negative input terminal connected to line 164. The inverter 202 is of a type capable of changing alternating electrical current into direct electrical current. A positive output terminal of the inverter 202 is connected to a bank 204 of 15 conventional storage batteries 206, the batteries being arranged in a 5×3 array and connected in series. The last such battery 206 has a terminal connected by positive lead 208 to a positive input terminal of a second inverter 210. The negative output terminal of the inverter 202 is connected by a negative lead 212 to the negative input terminal of the inverter 210. Inverter 210 is a conventional inverter of a type which changes direct electrical current into alternating electrical current. A positive lead 214 connected to the positive output terminal of inverter 210 and a negative lead 216 connected to a negative output terminal of the inverter 210 comprise an electrical conductor 218 connectable to the utility line 150 through a plug 220 which is engaged by wall socket 158. A direct current voltage meter 222 has a positive terminal thereof connected to lead 208 and a negative terminal thereof connected to lead 212 in order to supply an indication of the voltage charge stored in the battery bank 204.

Figure 8:
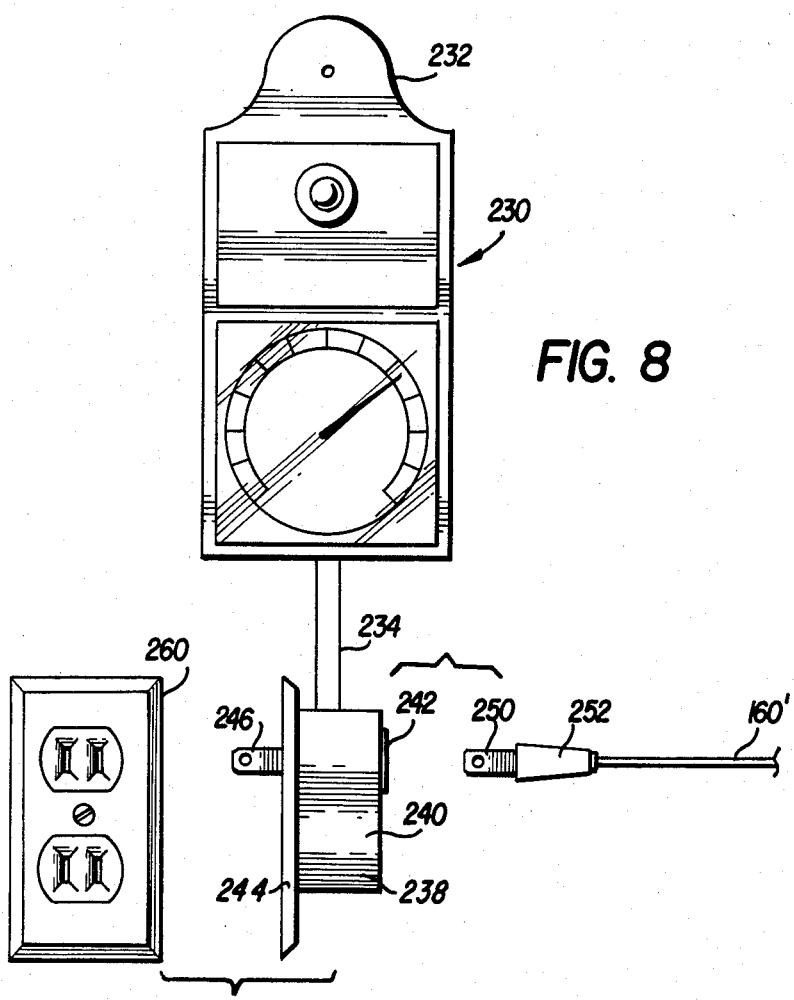
FIG. 8 is a schematic view of an indicator device associated with a modular plug-in unit according to an embodiment of the invention.

FIG. 8 illustrates an embodiment wherein an indicator means 230 comprising a plaque 232 is connected by electrical conductor means 234 (including a negative lead and a positive lead) to a modular unit 236. Modular unit 236 comprises an essentially rectangular housing 238 having a portion of a front face 240 thereof adapted to function as an electrical socket 242. A flat essentially rectangular support 244 is secured to the back of the housing 238 and has two prong-like conductors 246 extending therethrough perpendicular to the plane of the support 244. A negative terminal of the socket 242 is connected to a negative lead in the conductor 234 and to a negative terminal of the prong means 246. A positive terminal of the socket 242 is connected to a positive lead in the conductor 234 and to a positive terminal of the prong means 246. The housing 238 further includes current rectifying means, such as a silicon rectifier or a relay coil electrically connected therein, so that electrical current can flow in one direction only (the direction from the socket 242 toward the plug 246). Socket 242 is adapted to receive prong-like connectors 250 of a plug 252 formed at the end of electrical conductor means 160'. In other respects, conductor 160' resembles the conductor 160 insofar as is connected to the generating means 50 of the windmill 20. The prong conductors 246 of the modular unit 236 are insertable into a conventional wall socket 260 which, in the manner similar to the wall sockets 156 and 158 of FIG. 6, is connected to a utility line 150.

Figure 9:
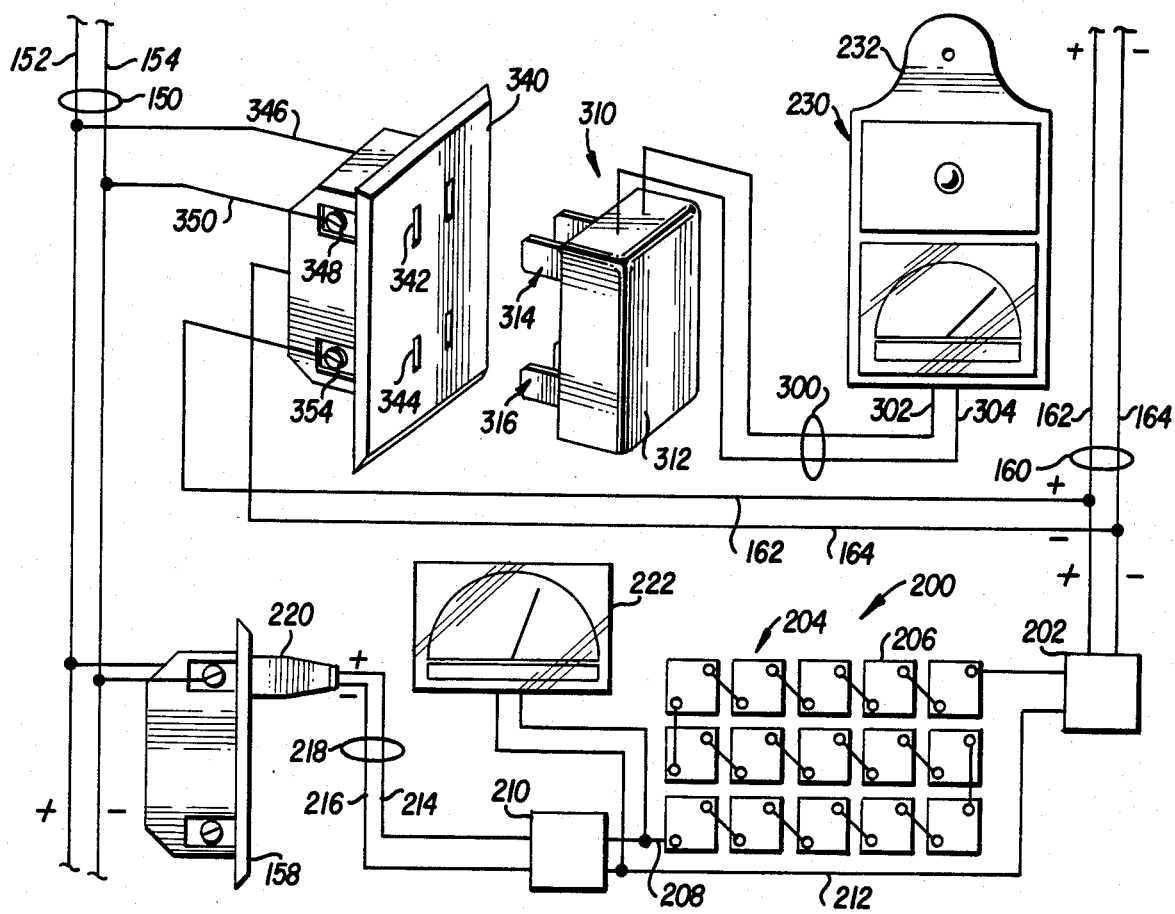
FIG. 9 is a schematic view of an indicator device associated with a modular plug-in unit according to another embodiment of the invention; and, FIGS. 10A and 10B are cross-sectional side views of modular plug-in units according to embodiments of the invention.

FIG. 9 illustrates an embodiment wherein indicator means 230 comprising a plaque 232 is connected by electrical conductor means 300 (including a negative lead 302 and a positive lead 304) to a modular unit 310. Modular unit 310, also seen in FIG. 10A, comprises an essentially rectangular housing 312 having two sets 314, 316 of prong-like conducting connectors extending perpendicularly from a back pannel thereof. The positive terminal of prong set 316 is connected to negative lead 302. In the housing 312 a positive lead 318 connects lead 304 to a positive terminal of a conventional 110 volt relay coil 320 while a negative lead 322 connects lead 302 to a negative terminal of the coil 320. A negative lead 324 connects the negative terminal of coil 320 to the negative terminal fo the prong set 314. The positive terminal of prong set 314 is connectable through lead 326 to lead 318 when the coil 320 is activated.

Figure 10A:
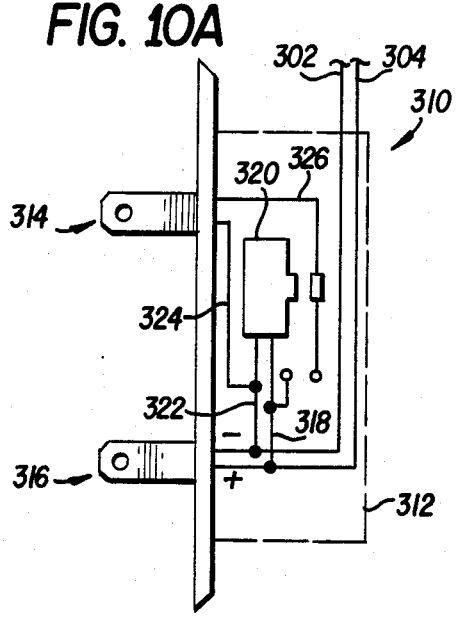
Figure 10B:
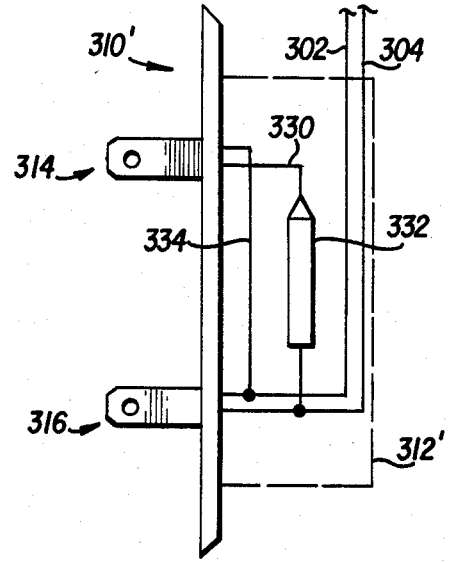

FIG. 10B illustrates a embodiment of a modular unit 310' similar to the modular unit 310 of FIG. 10A, but wherein lead 304 is connected by a lead 330 having a silicon rectifier 32 thereon to the positive terminal of the prong set 314. The lead 302 is connected by a lead 334 to the negative terminal of the prong set 314.

FIG. 9 further illustrates a special wall socket 340 having two sets 342, 344 of conventional prong-receiving socket slots therein. The upper set 342 of socket slots receives the prongs 314 of the modular unit (either unit 310 of the embodiment of FIG. 10A or unit 310' of the embodiment of FIG. 10B). A negative terminal associated with the set 342 of socket slots is connected by lead 346 to the negative lead 154 of the utility line 150; a positive terminal 348 associated with the set 342 of socket slots is connected by lead 350 to the positive lead 152 of the utility line 150. The lower set of socket slots receive the prongs 316 of the modular unit 310 or 310'. A negative terminal associated with the set 344 of socket slots is connected to the lead 164 of the electrical conductor 160, while a positive terminal 354 associated with the set 344 of socket slots is connected to lead 162 of the electrical conductor 160. FIG. 9 shows the battery charging system 200 connected essentially in the manner of FIG. 6.

OPERATION

When the wind velocity is less than 10 miles per hour (mph), the cups 28 are accordingly driven to impart rotational motion to the vertical shaft 22. At such a low wind velocity, the hardened tungsten steel point 70 of the lower end of shaft 22 remains in contact on the hardened tungsten steel block 72 comprising the end bearings 68. As shaft 22 rotates, gear 80 keyed thereto also rotates. Since gear 80 meshes with armature gears 84, the armatures gears 84 likewise rotate as do the armature shafts 55 keyed thereto. The armatures 54 rotate within their respective coils 52 while the lower end of the armatures shafts 55 have their hardened tungsten steel points 60 resting upon the hardened tungsten steel block 62 which comprises the end bearing 58.

When the velocity exceeds 10 mph, on the other hand, the airfoils 32 create a vertical lift which is applied to the frame 26 and to the rotatable vertical shaft 22. The vertical lift causes the frame 26 and the shaft 22 to rise vertically. In this regard, the tip 70 of the lower end of the shaft 22 rises above and out of contact with the steel block 72 upon which it previously was supported. As the shaft 22 rises vertically, so does the collar 102 secured thereto. As the shaft 22 rises, the bearings 106 on the upper surface of the collar 102 eventually contact the underside of the lift bar 92. In this respect, the bearings 106 contact lift bar 92 when a plane tangent to the top of the bearings 106 rises above a horizontal plane defined by the top surfaces of the lower stop members 98. Although the lift bar 92 had previously rested on the upper surfaces of the stop members 98, the rising collar 102 of shaft 22 lifts the bar 92 above the stop members 98 so that the bar 92 continues to travel upwardly with the shaft 22.

As the lift bar 9 moves upwardly the bearings 115 on bar 92 contact the collars 110 secured to the armature shafts 55, causing the collars 110 and shafts 55 to also rise. In this respect, the lift bar 92, as well as collars 110 and shafts 55, are not permitted to rise more than ¼ inch before the upper surface of the lift bar 92 comes in contact with the upper stop members 120. While the lift bar 92 is in an elevated position, the armature shafts 55 are also vertically elevated whereby the entire armature 54 as well as the lower end of the armature shaft including point 60A is lifted vertically above the plate 62 upon which it previously rested. The armature shaft 55 and armature 54 continue to rotate inasmuch as gear 84 still meshes with gear 82 during the vertical elevation. In this respect, gear 82 is sufficiently thick along the vertical dimension so that gears 84 can rise vertically and still be engaged with gear 82.

The three hardened tungsten steel points 60A, 60B, and 70 will remain elevated as long as the wind speed remains in excess of 10 mph. Thus, the present invention prevents wear on the hardened tungsten steel points 60A, 60B, and on the steel plate 62A and 62B, as well as prevents wear of the point 68 in the plate 72. The hardened tungsten steel points 60 of the two armatures and the hardened tungsten steel point of the shaft 22 are used only when the wind speed is below 10 mph at which speeds some low friction and resistance are required to enable the generators 50 to produce electric current. However, this low friction and resistance is not necessary when wind speeds are in excess of 10 mph, so that at such speeds wear and friction can be prevented.

Regardless of whether the airfoils 32 of the windmill 20 are providing a vertical lift at any point of time, rotation of the vertical shaft 22 as driven by the cup elements 28 and airfoils 32 results in the generation of alternating electrical current by the generator means 50. Depending on the rotational velocity of the vertical shaft 22, the magnitude of the alternating electrical current generated can range from a very few volts to at least 110 volts. With the electrical generators 50 connected in the manner of FIG. 6, whatever electrical voltage is created by the generators 50 is applied to the utility line 50 as a supplemental source of electrical current. In a desirable situation when the windmill 20 is rotating at such a velocity that the generator means 50 is producing about 100 volts of alternating electrical current, the suplemental current provided by the generator means 50 through the conductor 160 supplies essentially all the current that may be needed for the utility line 150 so that the primary source of electricity on utility line 150 need not be utilized. If, on the other hand, the generator means 50 is producing approximately 50 volts of alternating current as a result of lower wind velocity, the 50 volts of alternating current so produced is supplementally contributed to the utility power line so that any electrical device connected to the utility line 150 would use 50 volts supplied by the generator means 50 and another 60 volts supplied by the primary source connected to the utility line 150.

An advantage of the indicator means 180 is the notification to an electrical consumer, such as a home owner, of the availability of electrical current voltages between 100 and 110 volts from the generator means 50 of the windmill 20. In this respect, the light bulb 184 on the wall plaque 182 is illuminated when the wind generator on the roof is producing voltages over 100 volts. Of course, even when the light bulb 184 is not lit the generator means supplies alternating current. However, if the consumer desires to optimize the timing of his electrical consumption such that his predominate supply of electricity is from the generator means 50 rather than from the primary source connected to the utility line 150, the consumer can readily observe the illumination of the light bulb 184 and at that time turn on electrical devices (such as television, stereos, or vacuum cleaners). Utilizing the supplemental alternating electrical current produced by the generator means 50 in this manner enables the consumer to greatly reduce his expenditure for electrical consumption. When the generator means 50 is producing electricity that is not being utilized by the consumer, the electricity is stored in the bank 204 of storage batteries 206 using the battery charging system 200 depicted in either FIG. 6 or FIG. 9.

While the invention has been particularly shown and described with reference to preferred embodiments thereof, it will be understood by those skilled in the art that various alterations in form and detail may be made therein without departing from the spirit and scope of the invention. For example, a flasher can be utilized in conjunction with the indicator means 180 so that the light bulb 184 selectively flashes on and off when the generator means 50 is producing electrical current over 100 volts. As another example, the indicator device 180 is connected to provide an indication of direct current supply rather than alternating current.

The embodiments of the invention in which an exclusive property or privilege is claimed are defined as follows:

1. An apparatus for generating electricity from wind currents, the apparatus comprising:
   a rotatable vertical shaft for supporting impeller means, said impeller means including a horizontally extending frame and a plurality of winddriven elements secured at the periphery of the frame;
   airfoil means secured to said frame for providing a vertical lift force to said impeller means and to said rotatable vertical shaft when the wind velocity is of a sufficient magnitude;
   electrical generator means comprising a rotor and a coil, said rotor being vertically oriented and capable of slidable vertical movement with respect to said coil, the lower end of said rotor being selectively positionable upon a support;
   means for transmitting the rotational motion of said rotatable vertical shaft to said rotor of said electrical generator means; and,
   means for transmitting vertical lift created by said airfoil means to said rotor of said electrical generator means whereby said rotor is vertically lifted above said support upon which the lower end of said rotor would otherwise rest.

2. The apparatus of claim 1, wherein said frame includes radial members connecting its periphery to said rotatable vertical shaft; and wherein said airfoil means is secured to at least one of said radial members.

3. The apparatus of claim 1, wherein said means for transmitting the lift force created by said airfoil means to said rotor of said electrical generator means further comprises:
   collar means on said rotatable vertical shaft;
   lift bar means selectively engaged by said collar means when said rotatable vertical shaft experiences vertical lift; and,
   collar means secured to said rotor, said rotor collar means being selectively engaged by said lift bar means when said lift bar means experiences vertical lift.

4. The apparatus of claim 3 further comprising:
   lower stop means upon which said lift bar means rests when not experiencing vertical lift;
   upper stop means which limits the extent of vertical travel of said lift bar means when said lift bar means experiences vertical lift.

5. The apparatus of claim 3, wherein said lift bar means has a first aperture through which said vertically shaft rotatably extends, and wherein said collar means on said rotatable vertical shaft has bearing means on an upper surface thereof for selective engagement with the underside of said lift bar means.

6. The apparatus of claim 5, wherein said lift bar means has a second aperture through which said rotor rotatably extends, and wherein said lift bar means has bearing means on a upper surface thereof for selective engagement by the underside of said rotor collar means.

7. The apparatus of claim 1, wherein said rotatable vertical shaft is positionable upon a support when not experiencing vertical lift.

8. The apparatus of claim 1, wherein said electrical generator means comprises two electrical generators, each electrical generator including a rotor and a coil, each rotor being vertically oriented and capable of slidable vertical movement with respect to its coil, the lower end of each of said rotors being selectively positionable upon a support.

9. The apparatus of claim 8, wherein said means for transmitting the rotational motion of said rotatable vertical shaft to said rotors of said electrical generators comprise:
   a central gear secured to said rotatable vertical shaft; and,
   rotor gears secured to each of said rotors and adapted to mesh with said central gear.

10. The apparatus of claim 8, wherein said electrical generator means is adapted to produce alternating current.

11. The apparatus of claim 10, further comprising:
    electrical conductor means comprising a negative lead and a positive lead, said electrical conductor means being connected to said electrical generator means and connectable to a primary source of alternating electrical current, said electrical conductor means enabling said electrical generator means to provide a supplemental source of alternating electrical current to said primary source.

12. The apparatus of claim 11, further comprising:
    indicator means connectable to said electrical conductor means intermediate said electrical generator means and said primary source of alternating electrical current for providing an indication of when said electrical generator means is supplying alternating electrical current above a pre-determined voltage level.

13. The apparatus of claim 12, wherein said indicator means comprises a light bulb engaged in a light bulb socket, the light bulb socket having its positive terminal connected through a resistor of a predetermined resistance to the positive lead of said electrical conductor means, the light bulb socket having its negative terminal connected to said negative lead of said electrical conductor means.

14. The apparatus of claim 13, wherein said light bulb is a 7-watt bulb, and wherein said resistor is a 100 volt resistor whereby said light bulb is lit when said electrical generator means provides about 100 volts of alternating electrical current.

15. The apparatus of claim 11, wherein current rectifier means is connected on said electrical conductor means to prevent electrical current supplied by said primary source from affecting said electrical generator means.

16. The apparatus of claim 11, wherein chargable DC battery means is connected on said electrical conductor means intermediate said electrical generator means and said primary source of alternating electrical current.

17. The apparatus of claim 1, wherein said means for transmitting rotational motion, said electrical generator means, and said means for transmitting vertical lift are substantially housed in a housing means; and wherein said housing means is held aloft on a support.

18. The apparatus of claim 1, wherein said frame includes radial members connecting its periphery to said rotatable vertical shaft, said radial members having the shape of an inverted right triangle in cross-section, wherein said airfoil means comprises planar members secured to the hypotenuse surface of at least one of said radial members.

19. The apparatus of claim 18 wherein the ratio of the length of the inverted horizontal base of said right triangle to the length of its horizontal leg is approximately 3:1.

20. The apparatus of claim 1, wherein said wind-driven elements are cup impellers.

21. The apparatus of claim 12 wherein said electrical conductor means comprises a negative lead and a positive lead, said electrical conductor means being connected to said electrical generator means and connectable to a primary source of alternating electrical current, said electrical conductor means allowing said electrical generator means to provide a supplemental source of alternating electrical current to said primary source; and wherein said indicator means is connectable to said electrical conductor means intermediate said electrical generator means and said primary source of alternating electrical current for providing an indication of when said electrical generator means is supplying alternating electrical current above a pre-determined voltage level, said indicator means being electrically connected to a modular unit, said modular unit being adapted to plug into a socket for connection to said primary source of alternating electrical current.

22. The apparatus of claim 21, wherein said indicator means comprises a light bulb engaged in a light bulb socket, the light bulb socket having its positive terminal connected through a resistor of a predetermined resistance to the positive lead of said electrical conductor means, the light bulb socket having its negative terminal connected to said negative lead of said electrical conductor means.

23. The apparatus of claim 22, wherein said light bulb is a 7-watt bulb, and wherein said resistor is a 100 volt resistor whereby said light bulb is lit when said electrical generator means provides about 100 volts of alternating electrical current.

24. The apparatus of claim 21, wherein current rectifier means is connected on said electrical conductor means to prevent electrical current supplied by said primary source from affecting said electrical generator means.

25. The apparatus of claim 21, wherein chargable DC battery means is connected on said electrical conductor means intermediate said electrical generator means and said primary source of alternating electrical current.

26. The apparatus of claim 21, wherein said modular unit is partially fashioned as a socket and adapted to receive a plug connected to the leads of said electrical conductor means.

27. The apparatus of claim 21, wherein said modular unit has two sets of connectors associated therewith, said first set of connectors being adapted to electrically connect said indicator means to said primary source of alternating electrical current, said second set of connectors being adapted to electirically connect said indicator means to electrical conductor means connected to said electrical generator means.

28. A method of generating electricity from wind currents comprising the steps of:
  using a rotatable vertical shaft to support impeller means, said impeller means including a horizontally extending frame and a plurality of wind-driven elements secured at the periphery of the frame;
  securing airfoil means to said frame for providing a vertical lift force to said impeller means and to said rotatable shaft when the wind velocity is of a sufficient magnitude;
  positioning a rotor in a coil of an electrical generator whereby said rotor is vertically slidable with respect to said coil, the lower end of said rotor being selectively positionable upon a support;
  transmitting the rotational motion of said rotable vertical shaft to said rotor of said electrical generator means; and,
  transmitting vertical lift created by said airfoil means to said rotor of said electrical generator means, whereby said rotor is vertically lifted above said support upon which the lower end of said rotor would otherwise rest.

* * * * *